United States Patent Office 2,765,315
Patented Oct. 2, 1956

2,765,315

PREPARATION OF ESTERS

Richard C. Mansfield, Haddonfield, and Claude J. Schmidle, Moorestown, N. J., assignors to Rohm & Haas Company, Philadelphia, Pa., a corporation of Delaware No Drawing. Application April 26, 1954,
Serial No. 425,712

8 Claims. (Cl. 260—294.3)

This invention deals with a method for preparing esters of lower monocarboxylic acids and 1-methyl-4-piperidinols having also a hydrocarbon substituent in the 4-position.

Synthesis of various 1-alkyl-4-aryl-4-acyloxypiperidines has been accomplished through reaction of lithium aryls or arylmagnesium halides with 1-alkyl-4-piperidones followed by acylation. These esters have been shown to act as analgesics. The methods of preparing such compounds have been rather cumbersome and tedious.

We have discovered a more direct and convenient method for making esters of the structure

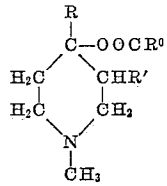

wherein R is a phenyl group or a methyl group, $R^0$ is an alkyl group, preferably of one to two carbon atoms, and R' is hydrogen or methyl.

Our process comprises reacting an α-methylstyrene, an α-ethylstyrene, isobutylene, or 2-methyl-1-butene, which may be represented by the formula

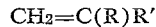

$$CH_2=C(R)R'$$

where R is phenyl or methyl and R' is methyl or ethyl, with N,N',N''-trimethylhexahydro-1,3,5-triazine of the structure

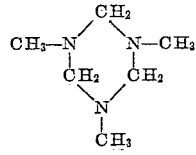

and a monocarboxylic acid of the formula $R^0COOH$, where $R^0$ is an alkyl group, particularly an alkyl group of not over two carbon atoms. These three reactants are mixed and the mixture is heated between 80° and 125° C. The reaction proceeds more readily when phosphoric acid is added to the reaction mixture. We have successfully operated with no phosphoric acid up to over a mole of phosphoric acid per mole of olefin, the common 85% orthophosphoric acid being used for this purpose. Conveniently acid anhydride may be added to dispose of water in the acid. We have also found various complex or polyphosphoric acids helpful.

There is theoretically required at least one mole of carboxylic acid per mole of olefin, but an excess seems generally desirable. Excess acid serves as a solvent.

About an equivalent of the N,N'N''-trimethyltrimethylenetriamine should be used per mole of olefin. The proportion used need not, however, be exact.

As a monocarboxylic acid there is used acetic or propionic acid by choice, although longer chained acids can be reacted. It is helpful to use along with the acid some of its anhydride or the anhydride may be used as the equivalent of the acid.

The above triamine is prepared, as has been shown, from methylamine and formaldehyde. Theoretically at least, other primary amines could be used in the place of methylamine, such as ethylamine, butylamine, allylamine, benzylamine, or cyclohexylamine. The formaldimine which forms tends to trimerize. The reaction is completed by added caustic soda until the mixture separates into two phases, the upper layer being the desired product.

In a typical preparation of this reactant, 76 parts by weight of aqueous 37% formaldehyde solution is slowly added to 83 parts by weight of aqueous 40% methylamine solution with stirring and cooling, the temperature of the reaction mixture being kept below 10° C. Solid caustic soda is then added in increments until two liquid phases form and separate. The upper layer is taken. The lower layer is extracted with benzene and the extracts are added to the upper layer. The resulting solution is dried over anhydrous potassium carbonate and distilled. At 65°–75° C./35 mm., there is obtained a fraction of practically pure N,N',N''-trimethyltrimethylenetriamine or hexahydro-1,3,5-trimethyl-1,3,5-triazine in an amount of at least 36 parts by weight.

Typical preparations according to this invention are presented in the following illustrative examples wherein parts are by weight.

Example 1

There are mixed 250 parts of glacial acetic acid and 100 parts of α-methylstyrene. Thereto is slowly added N,N',N''-trimethylhexahydro-1,3,5-triazine to a total of 36 parts. The mixture is stirred and heated at 95° C. for four hours and left standing for two days. The reaction mixture is then poured into about 700 parts of water. This mixture is extracted with benzene. It is now made basic by adding aqueous caustic soda solution. The basic material which separates is taken up in benzene and the water layer is extracted with benzene. The combined benzene solutions are dried over potassium carbonate and distilled. Between 82° and 122° C./2 mm. a forerun of 9 parts is taken off. At 122°–132° C./2 mm. a fraction of 23 parts is distilled off. This is quite pure 1-methyl-4-phenyl-4-acetoxypiperidine. When this fraction is stirred and cooled, it crystallizes. Upon recrystallization from heptane, the product melts at 62°–64° C. It contains by analyses 72.0% of carbon, 8.34% of hydrogen, and 5.97% of nitrogen. It gives a neutral equivalent of 230. Theoretical values are carbon 72.07%, hydrogen 8.21%, and nitrogen 6.00%, with a theoretical neutral equivalent of 233.

Example 2

There are mixed 210 parts of glacial acetic acid, 60 parts of acetic anhydride, and 58 parts of orthophosphoric acid with cooling. There are added to this mixture 65 parts of 1,3,5-trimethylhexahydro-1,3,5-triazine and 59 parts of α-methylstyrene. The resulting reaction mixture is stirred and heated at 115° C. for four hours, allowed to stand for two days, and poured into 500 parts of water. The aqueous mixture is extracted with benzene and then made alkaline by the addition of aqueous caustic soda solution. A basic organic product separates and is taken up in benzene. The benzene layer is taken off, dried over anhydrous potassium carbonate, and distilled. A fraction is taken off at 70°–100° C./0.85 mm. and then another fraction of 35 parts is obtained at 100°–120° C./0.85 mm. This corresponds in composition to 1-methyl-4-phenyl-4-acetoxypiperidine. A residue of 19 parts remains. The 1-methyl-4-phenyl-4-acetoxypiperidine crystallizes when stirred and cooled. The crystals melt at 61°–62° C. after recrystallization from heptane.

Example 3

There are mixed with stirring 198 parts of propionic acid and 51 parts of propionic anhydride and then 85% orthophosphoric acid is slowly added to an amount of 58 parts. Additions are then made of 65 parts of hexahydro-1,3,5-trimethyl-1,3,5-triazine and 59 parts of α-methylstyrene. The mixture is stirred at 115°–120° C. for five hours, allowed to stand for 16 hours, and poured into 1000 parts of water. The resulting mixture is extracted with benzene and then rendered basic by addition of aqueous caustic soda solution. Basic products which separate are taken up with benzene. The benzene layer is dried over potassium carbonate and distilled to give 12 parts of material distilling at 70°–110° C./0.9 mm. and 16 parts of product distilling at 110°–125° C./0.9 mm. A residue of 4 parts remains. The fraction containing the desired ester, 1-methyl-4-phenyl-4-propionoxypiperidine, is redistilled and a center cut of 9 parts coming over at 113°–117° C./0.9 mm. is taken for analysis. It contains 73.48% of carbon, 8.62% of hydrogen, and 6.4% of nitrogen. Theoretical values are 72.84%, 8.56%, and 5.7%, respectively. It has a refractive index, $n_D^{25}$, of 1.5270.

The above procedure is repeated with omission of the addition of phosphoric acid. There are obtained 8 parts of forerun distilling at 60°–112° C./1.1 mm.; 9 parts of product distilling at 112°–130° C./1.1 mm., and 7 parts of residue.

Example 4

To a stirred mixture of 777 parts of glacial acetic acid and 100 parts of α-ethylstyrene there are slowly added 125 parts of hexahydro-1,3,5-trimethyl-1,3,5-triazine. The reaction mixture is stirred and heated at 95°–100° C. for four hours and left standing for two days. It is then poured into 2000 parts of water. The resulting mixture is extracted with benzene and rendered alkaline by addition of aqueous caustic soda solution. Basic material separates and is taken up with benzene. This benzene extract is dried over anhydrous potassium carbonate and distilled. A fraction of 16 parts is taken at 80°–120° C./1.4 mm. and a second fraction at 120°–140° C./1.4 mm., leaving a residue of 22 parts. The second fraction is redistilled, the cut coming over at 115°–120° C./0.9 mm. containing 1,3-dimethyl-4-phenyl-4-acetoxypiperidine. This distillate has a neutral equivalent of 245 (theory 247) and a refractive index of 25° C. of 1.5189.

Example 5

To a stirred, cooled mixture of 298 parts of propionic acid and 175 parts of propionic anhydride, 85% phosphoric acid is added to a total of 150 parts. When heat is no longer liberated, there are slowly added 103 parts of hexahydro-1,3,5-trimethyl-1,3,5-triazine and 104 parts of α-ethylstyrene. The reaction mixture is stirred at 125° C. for 18 hours, cooled, and poured into 3000 parts of water. The aqueous mixture is extracted with benzene, thus removing unreacted olefinic material, and then made alkaline with caustic soda. Basic products separate. The alkaline mixture is extracted with benzene. The benzene solution is dried over over potassium carbonate, and distilled. Fractionation under reduced pressure gave a fraction of 7 parts distilling at 30°–80° C./1.5 mm., a fraction of 27 parts distilling at 80°–120° C./1.5 mm., a fraction of 31 parts distilling at 120°–160° C./1.5 mm., and 16 parts of residue. The third fraction is redistilled at 120°–135° C./1.5 mm. The product thus obtained contains 1,3-dimethyl-4-phenyl-4-propionoxypiperidine. It has a neutral equivalent of 259 (theory 261) and a refractive index of 25° C. of 1.5387.

Example 6

A shaking autoclave is charged with 105 parts of glacial acetic acid, 75 parts of acetic anhydride, 58 parts of 85% phosphoric acid, 65 parts of hexahydro-1,3,5-trimethyl-1,3,5-triazine, and 30 parts of isobutylene. The charge is shaken and heated at 125° C. for four hours. The autoclave is shaken for another four hours without heat and cooled to room temperature. The reaction mixture is heated on a steam bath at 15 mm. pressure. The residue is diluted with 2000 parts of water. The resulting mixture is extracted with benzene, stripped under reduced pressure to remove volatile, non-basic material, and then carefully neutralized with cooling with sodium carbonate solution. The neutralized mixture is extracted with benzene. The benzene extract is dried over potassium carbonate and distilled. At 83°–87° C./16 mm. a fraction of 15 parts is obtained. This is redistilled and the cut obtained at 83°–85° C./15 mm. taken for analysis. This material corresponds fairly well in composition to 1,4-dimethyl-4-acetoxypiperidine. The refractive index at 25° C. is 1.446. The saponification number is 316, corresponding to a purity of 95%.

We claim:

1. A process for preparing esters of the structure

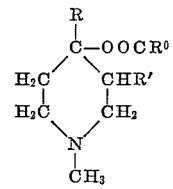
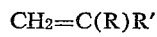

which comprises reacting together between 80° and 125° C. an olefinic hydrocarbon, $$CH_2=C(R)R'$$

hexahydro-1,3,5-trimethyl-1,3,5-triazine, and an acid, $R^0COOH$, where R is a member of the class consisting of the methyl and phenyl groups, R' is an alkyl group of not over two carbon atoms, and $R^0$ is an alkyl group of not over two carbon atoms, the said acid being used in an amount about at least molecularly proportional to the hydrocarbon and the said triazine being about equivalent to said hydrocarbon.

2. The process of claim 1 in which phosphoric acid is present as a catalyst.

3. A process for preparing esters of the structure

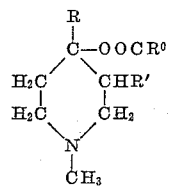
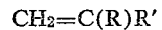

which comprises reacting together between 80° C. and 125° C. an olefinic hydrocarbon, $$CH_2=C(R)R'$$

hexahydro-1,3,5-trimethyl-1,3,5-triazine, an acid $R^0COOH$, and its anhydride, where R is a member of the class consisting of the methyl and phenyl groups, R' is an alkyl group of not over two carbon atoms, and $R^0$ is an alkyl group of not over two carbon atoms, the said acid being used in an amount about at least molecularly proportional to the hydrocarbon and the said triazine being about equivalent to said hydrocarbon.

4. The process of claim 3 in which phosphoric acid is present as a catalyst.

5. A process for preparing 1-methyl-4-phenyl-4-acetoxy-piperidine which comprises reacting a mixture containing α-methylstyrene, hexahydro-1,3,5-trimethyl-1,3,5-triazine, and acetic acid between 80° and 125° C., the acetic acid being used in an amount about at least molecularly proportional to the α-methylstyrene and the said triazine being about equivalent to the α-methylstyrene.

6. A process for preparing 1-methyl-4-phenyl-4-propionoxypiperidine which comprises reacting a mixture containing α-methylstyrene, hexahydro-1,3,5-trimethyl- 1,3,5-triazine, and propionic acid between 80° and 125° C., the propionic acid being used in an amount at least molecularly proportional to the α-methylstyrene and the said triazine being about equivalent to the α-methylstyrene.

7. A process for preparing 1,3-dimethyl-4-phenyl-4-acetoxypiperidine which comprises reacting a mixture containing α-ethylstyrene, hexahydro-1,3,5-trimethyl-1,3,5-triazine, and acetic acid between 80° and 125° C., the acetic acid being used in an amount about at least molecularly proportional to the α-ethylstyrene and the said triazine being about equivalent to the α-ethylstyrene.

8. A process for preparing 1,3-dimethyl-4-phenyl-4-propionoxypiperidine which comprises reacting a mixture containing α-ethylstyrene, hexahydro-1,3,5-trimethyl-1,3,5-triazine, propionic acid, and phosphoric acid between 80° and 125° C., the propionic acid being used in an amount about molecularly proportional to the α-ethylstyrene and the said triazine being about equivalent to the α-ethylstyrene.

References Cited in the file of this patent
UNITED STATES PATENTS 2,498,433   Lee _____ Feb. 21, 1950